US009499231B2

(12) United States Patent
Bryne

(10) Patent No.: US 9,499,231 B2
(45) Date of Patent: Nov. 22, 2016

(54) PEDAL AND CLEAT ASSEMBLY

(71) Applicant: Richard M. Bryne, San Diego, CA (US)

(72) Inventor: Richard M. Bryne, San Diego, CA (US)

(73) Assignee: Speedplay, Inc., San Diego, CA (US)

(*) Notice: Subject to any disclaimer, the term of this patent is extended or adjusted under 35 U.S.C. 154(b) by 57 days.

(21) Appl. No.: 13/828,782

(22) Filed: Mar. 14, 2013

(65) Prior Publication Data

US 2014/0260785 A1 Sep. 18, 2014

(51) Int. Cl.
*B62M 3/00* (2006.01)
*B62M 3/08* (2006.01)

(52) U.S. Cl.
CPC ............. *B62M 3/086* (2013.01); *Y10T 74/217* (2015.01)

(58) Field of Classification Search
CPC ........... B62M 3/086; B62M 3/083; A63B 5/14
USPC .............................................. 74/594.1, 594.6
See application file for complete search history.

(56) References Cited

U.S. PATENT DOCUMENTS 1,370,730 A 3/1921 Carver
3,808,910 A 5/1974 Desbois
3,859,867 A 1/1975 Haines et al.
4,055,005 A 10/1977 Meinhart
4,298,210 A 11/1981 Lotteau
4,488,453 A 12/1984 Drugeon et al.
4,599,914 A 7/1986 Dunn et al.
4,599,915 A 7/1986 Hlavac et al.
4,735,107 A 4/1988 Winkie
4,739,564 A 4/1988 Eser
4,803,894 A 2/1989 Howell
4,815,333 A 3/1989 Sampson
4,819,504 A 4/1989 Sampson
4,827,633 A 5/1989 Feldstein (Continued)

FOREIGN PATENT DOCUMENTS

DE 2816189 A1 8/1979
DE 3315282 A1 10/1984

(Continued)

OTHER PUBLICATIONS bont.com, Bont Crono, www.bont.com/cycling/pages/bontcrono.html.

(Continued)

*Primary Examiner* — Vicky Johnson
(74) *Attorney, Agent, or Firm* — Sheppard, Mullin, Richter & Hampton LLP

(57) ABSTRACT

Pedal and cleat assemblies are described. The pedal has first and second retainers biased to an engagement position for coupling the cleat. The cleat comprises first and second portions configured to be secured by the first and second retainers. The second portion has first and second urging surfaces. Either one or both of the first and second retainers is/are urged to permit the first and second portions to be secured by the first and second retainers. Either one or both of the first and second retainers is/are urged to permit the secured second portion to be released from the second retainer when a force or contact is applied by the second urging surface onto a lateral surface of the second retainer. At least one of the second urging surface and the lateral surface of the second retainer is made of a material having a measure of hardness that is greater than hardened steel. Preferably, the material is a carbide.

27 Claims, 12 Drawing Sheets

200 230 220a 212a 212b 240 220b 232 222b 220b 214 210 280a A 282b 282a 280b 290 260 B 270 250 282b

(56) References Cited

U.S. PATENT DOCUMENTS

| | | | | |
|---|---|---|---|---|
| 4,827,797 | A | 5/1989 | Le Faou et al. | |
| 4,840,086 | A | 6/1989 | Bidal | |
| 4,898,063 | A | 2/1990 | Sampson | |
| 4,899,618 | A | 2/1990 | Christol | |
| 4,936,164 | A | 6/1990 | Forke | |
| 4,942,778 | A | 7/1990 | Bryne | |
| 5,007,185 | A | 4/1991 | Lazarski | |
| 5,031,342 | A | 7/1991 | Crook | |
| 5,079,968 | A | 1/1992 | Starner | |
| 5,199,324 | A | 4/1993 | Sain | |
| 5,213,009 | A | 5/1993 | Bryne | |
| 5,284,066 | A | 2/1994 | Weiss | |
| 5,321,995 | A | 6/1994 | Zedan | |
| 5,325,738 | A | 7/1994 | Bryne | |
| 5,363,573 | A | 11/1994 | Kilgore et al. | |
| 5,371,903 | A | 12/1994 | Lew | |
| 5,406,647 | A | 4/1995 | Lew | |
| 5,546,829 | A | 8/1996 | Bryne | |
| 5,553,516 | A | 9/1996 | Weiss | |
| 5,557,985 | A | 9/1996 | Nagano | |
| 5,575,184 | A | 11/1996 | De Schrijver | |
| 5,606,894 | A | 3/1997 | Bryne | |
| 5,657,558 | A | 8/1997 | Pohu | |
| 5,687,619 | A * | 11/1997 | Bryne | 74/594.6 |
| 5,697,262 | A | 12/1997 | Chen | |
| 5,727,429 | A | 3/1998 | Ueda | |
| 5,765,450 | A | 6/1998 | Kruger et al. | |
| 5,778,739 | A | 7/1998 | Takahama | |
| 5,784,931 | A | 7/1998 | Ueda | |
| 5,806,379 | A | 9/1998 | Nagano | |
| 5,852,955 | A | 12/1998 | Crisick et al. | |
| 5,860,330 | A | 1/1999 | Code et al. | |
| 5,862,716 | A | 1/1999 | Bryne | |
| 5,916,332 | A | 6/1999 | Chen | |
| D413,711 | S | 9/1999 | Hicks, Jr. | |
| 6,003,408 | A | 12/1999 | Hervig | |
| 6,014,914 | A | 1/2000 | Ueda | |
| 6,070,493 | A | 6/2000 | Chen | |
| 6,128,973 | A | 10/2000 | Nagano | |
| 6,151,989 | A | 11/2000 | Ueda | |
| 6,205,885 | B1 | 3/2001 | Hermansen et al. | |
| 6,244,136 | B1 | 6/2001 | Chen | |
| 6,309,010 | B1 | 10/2001 | Whitten | |
| 6,425,304 | B1 | 7/2002 | Bryne | |
| 6,446,529 | B1 | 9/2002 | Tanaka | |
| 6,453,771 | B1 | 9/2002 | Takahama et al. | |
| 6,490,948 | B2 | 12/2002 | Tanaka | |
| 6,494,117 | B1 | 12/2002 | Bryne | |
| 6,581,493 | B1 | 6/2003 | Gillane | |
| D481,974 | S | 11/2003 | Evans | |
| 7,013,754 | B2 | 3/2006 | Milanowski | |
| 7,017,445 | B2 | 3/2006 | Bryne | |
| 7,174,807 | B2 | 2/2007 | Bryne | |
| 7,322,259 | B2 | 1/2008 | De Bast et al. | |
| 7,383,646 | B2 | 6/2008 | Hall | |
| 7,472,498 | B2 | 1/2009 | Bryne | |
| D595,620 | S | 7/2009 | Kingsbury | |
| 7,779,560 | B2 | 8/2010 | Kay | |
| 7,856,905 | B2 | 12/2010 | Hsieh | |
| 7,877,904 | B2 | 2/2011 | Bryne | |
| 8,272,150 | B2 | 9/2012 | Bryne | |
| 8,387,287 | B2 | 3/2013 | Kay et al. | |
| D683,665 | S | 6/2013 | Smith | |
| 2001/0008093 | A1 | 7/2001 | Heim | |
| 2002/0073801 | A1 * | 6/2002 | Steinberg | 74/594.6 |
| 2002/0144569 | A1 | 10/2002 | Tanaka | |
| 2003/0051576 | A1 | 3/2003 | Muraoka | |
| 2004/0187635 | A1 | 9/2004 | Bryne | |
| 2004/0237705 | A1 | 12/2004 | Conarro et al. | |
| 2005/0155452 | A1 | 7/2005 | Frey | |
| 2005/0252337 | A1 | 11/2005 | Chen | |
| 2005/0284253 | A1 | 12/2005 | Hervig | |
| 2006/0070489 | A1 | 4/2006 | Chen | |
| 2006/0236809 | A1 | 10/2006 | Bryne | |
| 2007/0084086 | A1 | 4/2007 | Bryne | |
| 2007/0193402 | A1 | 8/2007 | Hsieh | |
| 2010/0107451 | A1 | 5/2010 | Kay et al. | |
| 2010/0301632 | A1 | 12/2010 | Bryne | |
| 2011/0219911 | A1 * | 9/2011 | Zoumaras | B62J 25/00 74/594.6 |
| 2011/0283568 | A1 | 11/2011 | Woodford | |
| 2012/0103131 | A1 | 5/2012 | Bryne | |
| 2012/0233891 | A1 | 9/2012 | Woodford | |
| 2013/0269477 | A1 * | 10/2013 | Williams | B62M 3/086 74/594.6 |
| 2014/0260786 | A1 * | 9/2014 | Bryne | B62M 3/086 74/594.6 |
| 2015/0201699 | A1 * | 7/2015 | Bryne | A43B 5/14 36/134 |

FOREIGN PATENT DOCUMENTS

| | | | | |
|---|---|---|---|---|
| DE | 3426103 | A1 | 1/1986 | |
| DE | 3149345 | C2 | 1/1989 | |
| DE | 202005019542 | U1 | 2/2006 | |
| EP | 0012097 | A2 | 6/1980 | |
| EP | 0015803 | A2 | 9/1980 | |
| EP | 0106162 | A1 | 4/1984 | |
| EP | 0153210 | A1 | 8/1985 | |
| EP | 0155114 | A2 | 9/1985 | |
| EP | 0293340 | A2 | 11/1988 | |
| EP | 0359134 | A2 | 3/1990 | |
| EP | 0485956 | A1 | 5/1992 | |
| EP | 0516013 | A2 | 12/1992 | |
| EP | 0619219 | A1 | 10/1994 | |
| EP | 0826587 | A1 | 3/1998 | |
| EP | 0894446 | A1 | 2/1999 | |
| FR | 2279607 | A1 | 2/1976 | |
| FR | 2518041 | A1 | 6/1983 | |
| FR | 2609270 | A1 | 7/1988 | |
| FR | 2711963 | A1 | 5/1995 | |
| FR | 2775424 | A1 | 9/1999 | |
| FR | 2899869 | A1 * | 10/2007 | B62M 3/086 |
| FR | 2932450 | A1 | 12/2009 | |
| JP | 64-23202 | | 7/1989 | |
| JP | 05111402 | | 5/1993 | |
| JP | H11-103902 | | 4/1999 | |
| JP | 2005-46629 | | 2/2005 | |
| TW | 368973 | | 9/1999 | |
| TW | 392662 | | 6/2000 | |
| TW | 200303278 | | 9/2003 | |
| TW | M293881 | | 7/2006 | |
| TW | I308543 | | 4/2009 | |
| WO | WO2004089741 | | 10/2004 | |

OTHER PUBLICATIONS pearlizumi.com, PI Aero Lycra Shoe Cover, www.pearlizumi.com/product.pjp?mode=view&pc_id=50&product_id=193110.

Frog Pedal Specifications, www.speedplay.com.

Speedplay brochure.

International Search Report for International Application No. PCT/US2010/056057.

International Preliminary Report on Patentability for International Application No. PCT/US2010/056057.

European Search Report for Application No. 13190753.7-1753.

Office Action for Japanese Patent Application No. 2011-540875.

* cited by examiner

PEDAL AND CLEAT ASSEMBLY

FIELD OF THE INVENTION

This invention relates generally to an improved pedal and cleat assembly and, more particularly, to pedal and cleat assemblies incorporating features which permit the ready engagement and release of the pedal and cleat under a variety of environmental conditions.

BACKGROUND

Clipless pedals (also known as "clip-in" or "step-in" pedals) require a cleat fitted to the sole of a rider's shoe, which locks to the pedal and thus holds the shoe firmly to the pedal. Clipless pedals take a variety of forms and are typically adapted for the demands of a particular type of cycling, such as road cycling and off-road or mountain biking.

Among the myriad of features desired for clipless pedals, the ability to readily engage the cleat to the pedal and to subsequently release the cleat from the pedal is important both for cycling efficiency and safety. The ability to readily release the cleat from the pedal is perhaps a more important factor in ensuring the safety of the rider, as it permits the rider to put one or both feet on the ground to maneuver the bike or to avoid a fall. The normal environmental conditions to which bicycles, and particularly off-road or mountain bikes, are subjected often compromise the ability to release the cleats from the pedal on demand.

What is therefore needed is an improved cleat and pedal assembly that permits the ready engagement and release of the pedal and cleat under a variety of environmental conditions.

BRIEF SUMMARY

Various embodiments of a cleat and pedal assembly are described herein which provide for reliable and ready engagement and release of the cleat and pedal assemblies. Clipless pedals, and particularly clipless pedals made for off-road use, are often designed with relatively small cleat parts that are mounted within a small recessed cavity, typically built into the shoe's sole. Because the cleats are relatively small, the contacting surfaces of the cleat and pedal assemblies are under high stress, high load and high friction during use and during the engagement and release. Given the high demands and forces applied to these relatively small parts, it is important that the contacting areas between the cleat and the pedals be made of materials that are resistant to wear and tear and also resistant to seizing. Thus, clipless pedals for off-road use are desirably made of a material that is not only sufficiently strong to withstand the mechanical stresses, but that also permits the reliable engagement and release functions under a variety of environmental conditions (e.g., wet, dirty, etc.). Metals, such has hardened steel, brass and, to a lesser degree, aluminum and plastic, have been employed in the contacting surfaces of the cleat and pedal assemblies with varying levels of success.

Metals, particularly hardened steel, has proven to be the preferred material for use in these contacting surfaces. The inventor has recognized, however, that metallic contact surfaces of cleat and pedal assemblies may "seize" or "cold-weld" to create an undesired adhesion between the metal contact surfaces and thus prevent the required relative sliding of the two surfaces to allow the cleat to release from the pedal. In other words, the coefficient of friction between the contacting surfaces (especially when subjected to water and dirt) increases to the point where there is "adhesive friction" between the contacting surfaces of the cleat and the pedal. This, in turn, interferes with the rider's ability to disengage from the pedals, thereby creating a dangerous situation for the rider.

One solution, as recognized by the inventor, is to employ materials of different hardness for the contacting surfaces of the cleat and pedal assembly involved in the engagement and release of the cleat to the pedal. In a preferred embodiment, at least one, if not both, of the contacting surfaces is made of a material, preferably a non-metallic material or a ceramic, having a measure of hardness that is greater than hardened steel. Carbides are a particularly preferred choice of material. Carbides are not only extremely durable and resistant to wear and corrosion, they maintain a low coefficient of friction under a variety of conditions and will not seize or cold weld with other metallic or carbide surfaces.

In one preferred embodiment, a pedal and cleat assembly is described. One of the pedal or cleat assembly comprises first and second retainers configured to be biased to an engagement position for coupling the other one of the pedal or cleat assembly. The other one of the pedal or cleat assembly comprises first and second portions configured to be releasably secured by the first and second retainers in the engagement position. The second portion has first and second urging surfaces. Either one or both of the first and second retainers are urged to a yielding position to permit the first and second portion to be secured by the first and second retainers upon application of a first force or contact by one upon the other of the first urging surface and an outer surface of the second retainer. Either one or both of the first and second retainer are configured to be urged to the yielding position to permit the secured second portion to be released from the second retainer upon application of a second force or contact by one upon the other of the second urging surface and a lateral surface of the second retainer. At least one of the second urging surface and the lateral surface of the second retainer is made of a material having a measure of hardness that is greater than hardened steel.

In accordance with a first aspect, the material comprises carbide, and preferably selected from the group consisting of: silicon carbide, boron carbide, tungsten carbide, and titanium carbide.

In accordance with a second aspect, one of the second urging surface and the lateral surface of the second retainer is made of a material comprising carbide and the other one of the second urging surface and the lateral surface is made of a material comprising a metal. Preferably, the metal is hardened steel.

In accordance with a third aspect, both the second urging surface and the lateral surface of the second retainer are made of a carbide.

In accordance with a fourth aspect, the lateral surface is radiused, beveled or curved and the second urging surface has a surface that is complementary to the lateral surface.

In accordance with a fifth aspect, the first and second retainers are provided on the pedal assembly and the first and second portions are provided on the cleat assembly.

In accordance with a sixth aspect, the first and second retainers are biased to an engagement position.

In a second preferred embodiment, another type of pedal and cleat assembly is described. One of the pedal or cleat assembly comprises a retainer portion configured to be biased to an engagement position to releasably secure an engagement portion disposed on the other one of the pedal or cleat assembly. The engagement portion comprises first and second urging surfaces. The retainer portion is configured to be urged to a yielding position to permit the engagement portion to be secured by the retainer portion upon application of a first force or contact by one upon the other of the first urging surface and an outer surface of the retainer portion. The retainer portion is configured to be urged to the yielding position to permit release of the engagement portion from the retainer portion upon application of second force or contact by one upon the other of the second urging surface and a lateral surface of the retainer portion. At least one of the second urging surface and the lateral surface of the retainer portion is made of a material having a measure of hardness that is greater than hardened steel.

In accordance with a first aspect, the material comprises carbide, and preferably selected from the group consisting of: silicon carbide, boron carbide, tungsten carbide, and titanium carbide.

In accordance with a second aspect, one of the second urging surface and the lateral surface of the retainer portion is made of a material comprising carbide and the other one of the second urging surface and the lateral surface of the retainer portion is made of a material comprising a metal. Preferably, the metal is hardened steel.

In accordance with a third aspect, both the second urging surface and the lateral surface of the retainer portion are made of a carbide.

In accordance with a fourth aspect, the retainer portion is resiliently biased to the engagement position.

In a third preferred embodiment, yet another type of pedal and cleat assembly is described. One of the pedal or cleat assembly comprises a retainer for removably coupling the other one of the pedal or cleat assembly, the retainer comprising a first surface. The other one of the pedal or cleat assembly comprises an engagement portion configured to be removably coupled to the retainer, the engagement portion having a second surface. The first and second surfaces are in contact with one another when the pedal and cleat assembly are coupled to one another. At least one of the first and second surfaces is made from a material having a measure of hardness that is greater than hardened steel.

In accordance with a first aspect, the material comprises carbide, and preferably one selected from the group consisting of: silicon carbide, boron carbide, tungsten carbide, and titanium carbide.

In accordance with a second aspect, one of the first and second surfaces is made of a material comprising carbide and the other one of the first and second surfaces is made of a material comprising a metal. Preferably, the metal is hardened steel.

In accordance with a third aspect, both the first and second surfaces are made of a carbide.

In accordance with a fourth aspect, the retainer is a spring movably coupled to the cleat assembly, and the engagement portion comprises a cam insert disposed within the pedal assembly, the spring being made of a resilient metal and the cam insert being made of a carbide.

Other objects, features and advantages of the described preferred embodiments will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting embodiments of the inventions may be more readily understood by referring to the accompanying drawings in which.

Like numerals refer to like parts throughout the several views of the drawings.

DETAILED DESCRIPTION OF THE PREFERRED EMBODIMENTS

Figure 1:
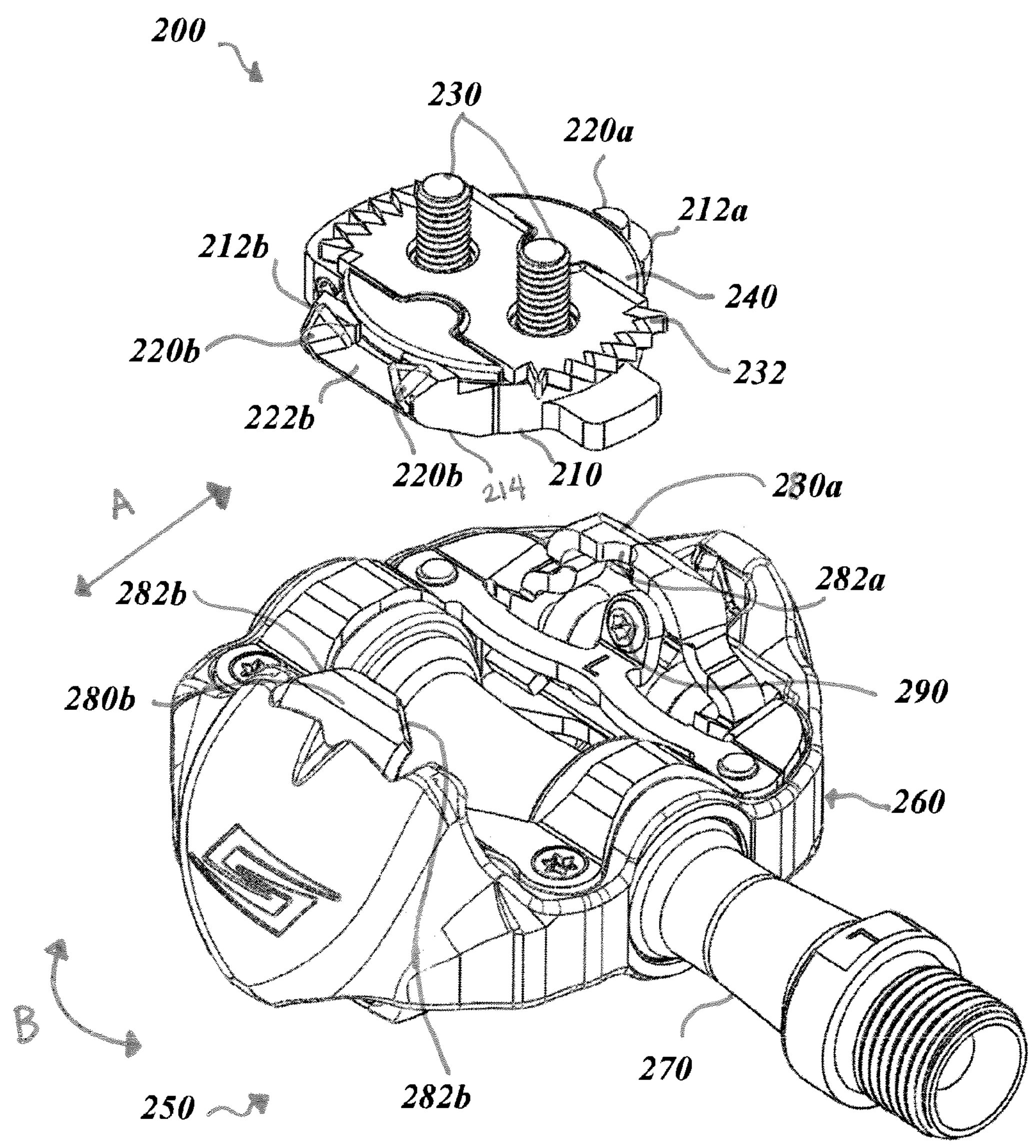
FIG. 1 is an exploded perspective view of another embodiment of a pedal and cleat assembly.

Specific, non-limiting embodiments of the present invention will now be described with reference to the drawings. It should be understood that such embodiments are by way of example only and merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

With reference now to the illustrative drawings, various embodiments of a bicycle pedal and cleat assembly are described and shown. The cleat assemblies described herein are designed to be secured to the underside of the sole of a rider's shoe (not shown), and are configured to be attachable to a double- or multi-sided pedal assembly. Because the pedal assembly is accessible from either one of the opposing sides (e.g., double-sided or multi-sided), the cleat assembly may be releasably secured to either one of the two sides of the pedal assembly, thereby obviating the need to "right" the pedal before attaching the cleat assembly thereto. In the various embodiments discussed herein, only left-sided pedal/cleat assemblies are described and illustrated in the drawings, with the understanding that the right-sided pedal assemblies are mere mirror images of the left-sided ones. While the preferred embodiments encompass double-sided pedal assemblies, it is understood that the pedal assemblies described and depicted herein may also be embodied in a pedal assembly having only a single side or multiple sides (e.g., four sided) configured to releasably secure the cleat assembly.

FIGS. 1-4 illustrate an embodiment of a pedal and cleat assembly. The basic components and assembly of the cleat assembly 200 are similar to the cleats described in co-pending U.S. Ser. No. 12/917,322, filed Nov. 1, 2010, for a Pedal-Cleat Assembly, the entire contents of which are incorporated herein by reference as if fully set forth herein. The cleat assembly 200 generally comprises a generally ring-shaped cleat body 210 that defines the forward cleat projection 212*a* and the rearward cleat projection 212*b*. The forward and rearward cleat projections 212*a*, 212*b* are sized and configured to engage and to be retained by the respective forward and rearward cleat retainers, 280*a*, 280*b* of the pedal assembly 250. In the embodiment shown in FIGS. 1-4, the forward cleat retainer 280*a* may be contoured to correspond to the forward projection 212*a* and, more particularly, to the forward shaped insert 220*a*. Screws 230 serve to couple together the various components of the cleat assembly 200, such as the cleat body 210, the spacer 240, a disc-shaped body (not shown) and the base plate 232, and the screws 230 directly mount these cleat assembly 200 components securely to the underside of the sole of a rider's shoe (not shown).

The cleat assembly 200 includes additional structure that allows the main cleat body 210, and its forward and rearward projections 212*a*, 212*b*, to rotate by a selected, limited amount relative to the rider's shoe about a cleat rotation axis that is generally perpendicular to the shoe sole, without disengaging the cleat assembly 200 from the pedal assembly 250. This provides a float angle, the precise mechanism of which is described in U.S. Ser. No. 12/917,322, published as U.S. Pub. No. 2012-0103131 on May 3, 2012 for "Pedal-Cleat Assembly", the entire contents of which are incorporated herein by reference in its entirety.

The pedal assembly 250 is shown to comprise an elongated spindle 270. One end of the elongated spindle 270 is configured to couple with and project laterally from a bicycle crank (not shown). The other end of the elongated spindle 270 is coupled to a pedal body 260 having identical upper and lower cleat support bases. The upper cleat support base is depicted in FIGS. 1 and 3 as comprising a forward cleat retainer 280*a* and a rearward cleat retainer 280*b* to form a seat for receiving and retaining forward and rearward cleat projections 212*a*, 212*b*.

Either one or both of the forward and the rearward cleat retainers 280*a*, 280*b* may be pivotally mounted to the pedal body. In the embodiment depicted in FIGS. 1 and 3, the rearward cleat retainer 280*b* is fixed relative to the cleat body and the forward cleat retainer 280*a* is pivotally mounted to and spring-biased toward the rearward cleat retainer 280*b*. Controlled adjustability of the amount of spring bias applied to the forward cleat retainer 280*a* is provided by an adjustment screw 290. Controllably rotating the adjustment screw 290 effectively tightens or loosens the spring tension to provides a controlled adjustment of spring tension.

Figure 3:
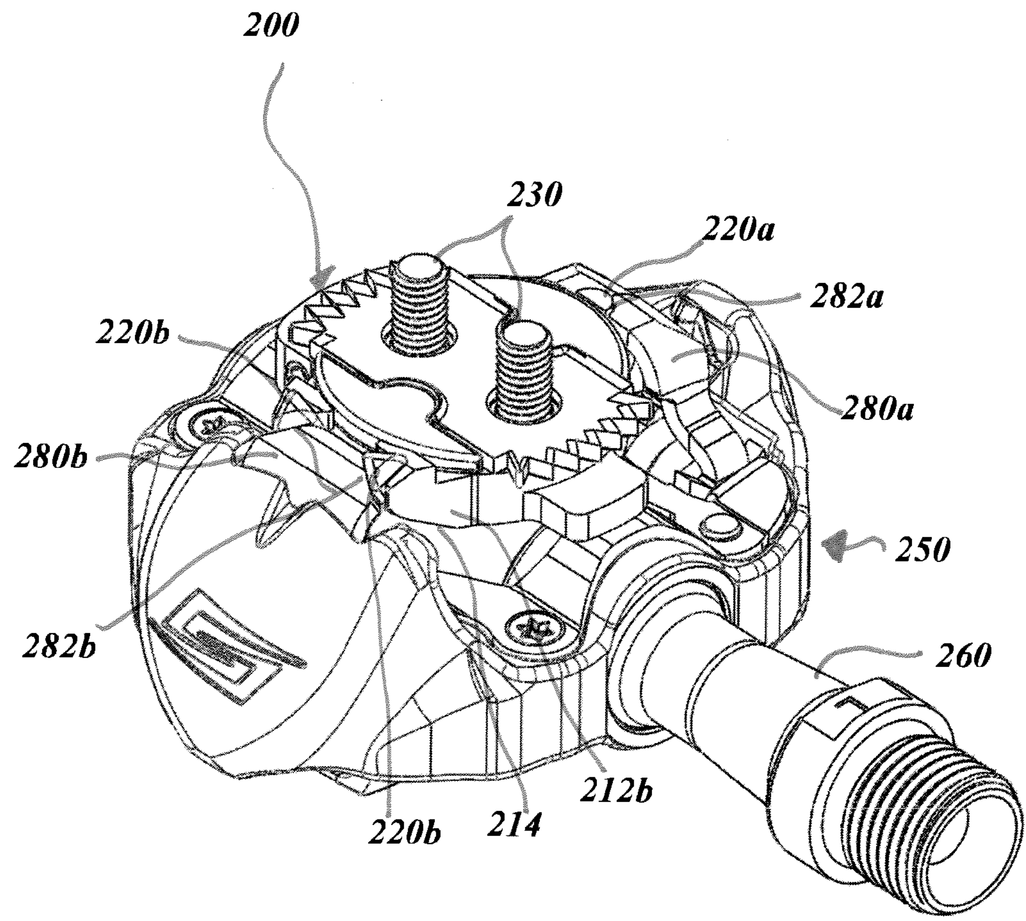
FIG. 3 is a perspective view of the pedal and cleat assembly of FIG. 1 coupled together in secure engagement.

It is understood that the opposite arrangement to the one depicted in FIGS. 1 and 3 may also be provided, in which the forward clear retainer 280*a* is fixed relative to the cleat body and the rearward cleat retainer 280*b* is pivotally mounted to and spring-biased toward the forward cleat retainer 280*a*. Alternatively, both the forward and rearward cleat retainers 280*a*, 280*b* may be pivotally mounted to and spring-biased toward one another.

Referring back to the embodiment depicted in FIGS. 1-4, in a preferred embodiment, one of the forward cleat retainer 280*a* and the forward projection 212*a* (and/or forward shaped insert 220*a*) is formed of hardened steel and the other one of the forward cleat retainer 280*a* and the forward projection 212*a* (and/or forward shaped insert 220*a*) is made of a material that has a measure of hardness that is greater than hardened steel. Alternatively or in addition, one of the rearward cleat projection 212*b* (and/or rearward shaped insert 220*b*) and the rearward cleat retainer 280*b* is formed of hardened steel and the other one of the rearward cleat projection 212*b* (and/or rearward shaped insert 220*b*) and the rearward retainer 280*b* is formed of a material that has a measure of hardness that is greater than hardened steel.

Any one of several measures of hardness may be used to determine the relative hardness of a material vis-à-vis hardened steel, such as Mohs, Vickers, Brinell, etc. Any material characterized as having a measure of hardness that is greater than hardened steel, regardless of the method of measurement, may be a suitable material for use in either one or both of a set of contacting surfaces. For example, hardened steel is generally characterized as having a Mohs hardness of about 7.0. Thus, any material having a Mohs hardness greater than 7.0 is suitable for use in either or both of the contacting surfaces.

Non-metals, such as ceramics and, more preferably, carbides represent one class of such suitable materials. Carbides are generally characterized as having a Mohs hardness of 9 or more and include silicon carbide, boron carbide, tungsten carbide and titanium carbide. Carbides are preferable because they are characterized as being extremely hard, non-brittle, resistant to corrosion, and resistant to adhering to other surfaces in the presence of friction Thus, in a preferred embodiment, the material has a Mohs hardness of greater than 7.0 and is made of a non-metal or a carbide, preferably selected from the group consisting of silicon carbide, boron carbide, tungsten carbide and titanium carbide.

The general principle here is that at least one (if not both) of the two frictional contacting surfaces involved in either the engagement or the release of the cleat and pedal assemblies is made of a material that has a measure of hardness that is greater than hardened steel (e.g., a Mohs hardness of greater than 7.0), preferably a non-metal or a carbide, preferably selected from the group consisting of silicon carbide, boron carbide, tungsten carbide and titanium carbide.

The frictional contacting surfaces involved in the engagement of the cleat and pedal assemblies comprise either or both pairs of (1) the forward cleat projection 212*a* (bottom surface or a first urging surface) and the facing outer surface of the forward cleat retainer 280*a* and (2) the rearward cleat projection 212*b* (bottom surface 214 or a first urging surface) and the facing outer surface of the rearward cleat retainer 280*b*.

The frictional contacting surfaces involved in the release of the cleat and pedal assembles comprise either or both pairs of: (1) the lateral surface of the forward cleat projection 212*a* and/or its shaped insert 220*a* (second urging surface) and the lateral surface of the forward cleat retainer 280*a* and (2) the lateral surface of the rearward cleat projection 212*b* and/or its shaped insert 220*b* (second urging surface) and the later surface 282 of the rearward cleat retainer 280*b*.

One application of this general principle is the avoidance of having both of the contacting surfaces of the same metallic material so as to avoid the problem of seizing, creating a cold weld or an adhesive surface between the two metals. In addition, the contacting surfaces must be of sufficient strength and durability to resist wear and tear.

The rearward cleat projection 212*b* of the cleat assembly 200 is depicted as comprising beveled first urging surface 214, shaped to facilitate engagement of the rearward projection 212*b* as the first urging surface 214 contacts and applies a downward force or contact upon the outer surface of the rearward retainer 280*b* (in a direction perpendicular to axis A). This corresponds to the first force or contact by the first urging surface 214 upon the outer surface of the rearward retainer 280*b* to urge either one or both of the forward and rearward cleat retainers 280*a*, 280*b* to a yielding position to permit the forward and rearward projections 212*a*, 212*b* to be secured by the forward and rearward cleat retainers 280*a*, 280*b*.

In the pedal assembly 250 depicted in FIGS. 1-4, only the forward cleat retainer 280*a* is moveable to provide the forward and rearward cleat retainers 280*a*, 280*b* in the yielding position. At least one of the abutting surfaces of the rearward cleat projection 212*b* and the rearward cleat retainer 280*b* are appropriately beveled or radiused, such that a downward pressure (in the direction perpendicular to A) forces the forward cleat retainer 280*a* in a forward direction against the yielding bias of the retaining portion. Once the rearward cleat projection 212*b* clears and snaps into position beneath the rearward cleat retainer 280*b*, the forward cleat retainer 280*a* spring biases and returns to an engagement state.

Again, at least one, if not both, of the first urging surface 214 and/or the outer surface of the rearward cleat retainer 280*b* is made of a material that is harder than hardened steel and, more preferably, is made of a carbide material.

Figure 2:
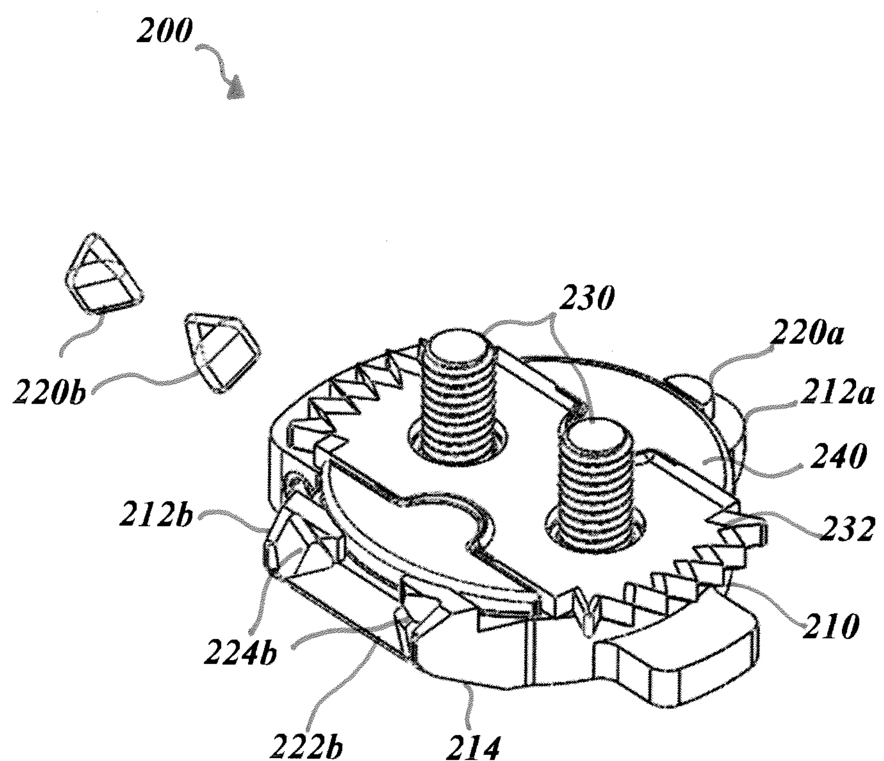
FIG. 2 is a perspective view of the cleat assembly of FIG. 1.

As further shown in FIG. 2, the rearward projection 212*b* comprises a pair of shaped inserts 220*b* to couple to correspondingly shaped recesses 224*b* formed on the opposing side of the beveled first urging surface 214 and contained within a cavity formed by the edge of the rearward projection 212*b* and the underside of the sole of the rider's shoe (not shown) to which the cleat assembly 200 is coupled. The shaped inserts 220*b* act as a cam surface for actuating the pedal assembly 250 and, more precisely, the forward and rearward cleat retainers 280*a*, 280*b* from an engagement position to a yielding position. The shaped inserts 220*b* are preferably made from a material that has a measure of hardness that is greater than hardened steel and, more preferably, of a carbide material. This permits a portion of the rearward retainer 280*b* to be made either of carbide or other appropriate material.

Figure 4A:
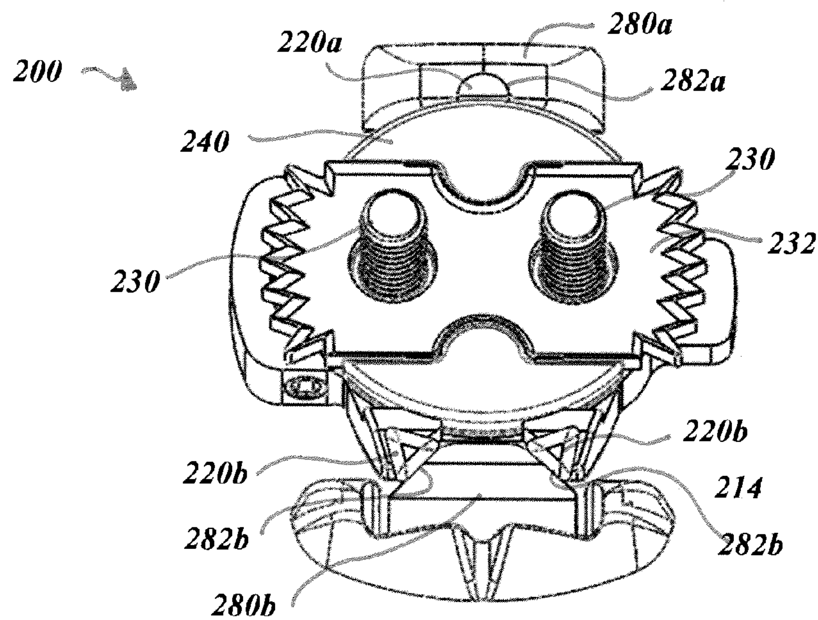
FIGS. 4A-4B illustrate the coupled pedal and cleat assembly and the release of the cleat assembly from the pedal assembly.
Figure 4B:
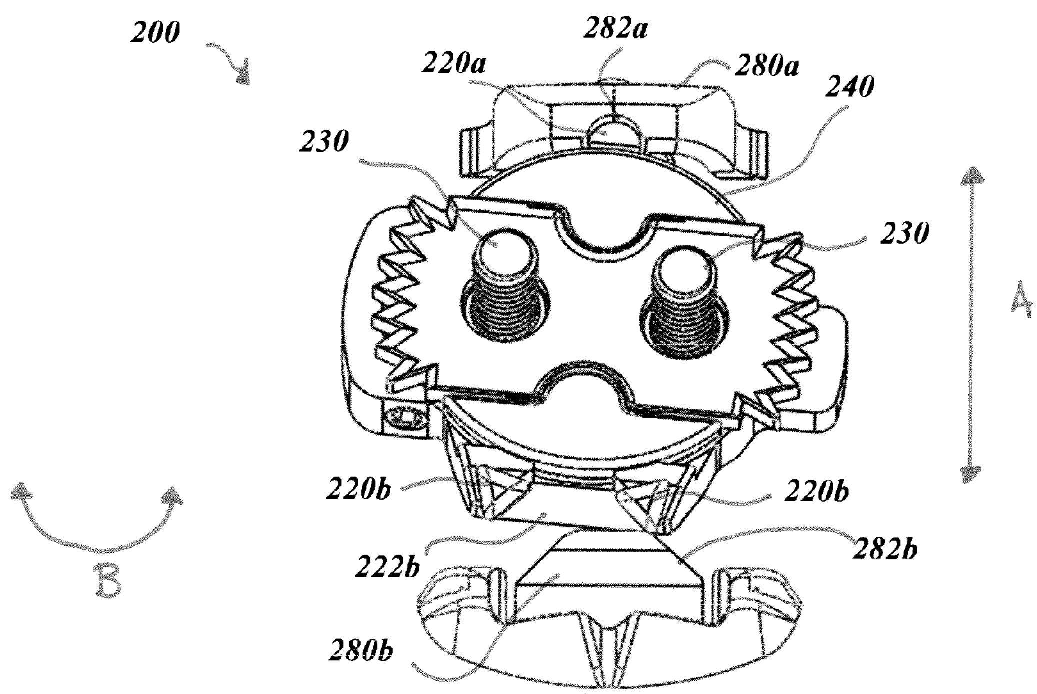

FIGS. 4A-4B depict the sequence of releasing the rear projection 212*b* (FIG. 4B) from a coupled cleat and pedal assembly (FIG. 4A). As can be seen in FIG. 4A, the lateral surfaces of the forward and rearward shaped inserts 220*a*, 220*b* act as a cam surface to permit disengagement of the secured or engaged cleat assembly from the pedal assembly by forcibly urging either one or both of the forward and reward retainers away from one another upon rotation of the cleat assembly 200 along the clockwise or counterclockwise direction B. Either one or both of the forward and rearward retainers 280*a*, 280*b* are configured to be urged to the yielding position to permit the secured forward and rearward projections 212*a*, 212*b* to be released upon the application of a second force or contact in the direction B by one upon the other of the second urging surface represented by the rearward shaped inserts 220*b* and a lateral surface of the rearward retainer 280*b*.

The rearward retainer 280*b* has shaped edges 282*b* which correspond to the contacting edges of the shaped inserts 220*b*. The shaped inserts 220*b* are angled such that a pivoting force or motion applied in either one of the direction B causes cam surfaces on the cleat assembly's forward cleat projection 220*a* and rearward cleat projection 220*b* to forcibly urge the respective forward and rearward cleat retainers 280*a*, 280*b* to a yielding position, apart from each other in the direction shown in A, against the yielding bias of the springs in the opposite direction. Eventually, the two cleat retainers 280*a*, 280*b* will be sufficiently spaced apart to release their retention of the two projections 212*a*, 212*b*. This releases the cleat assembly 200 from the pedal assembly 250.

In order to accommodate the rotational movement B of the cleat assembly 200 relative to the pedal assembly 250 in this process of release, the forward shaped insert 220*a* may be curved or semi-circular. In a preferred embodiment, either one or both of the forward shaped insert 220*a* and at least a contacting surface of the forward cleat retainer 282*a* is made of a carbide. In a preferred embodiment, very close tolerances are provided between the contacting surfaces of the shaped inserts 220*a*, 220*b* and the contacting surfaces of the forward and rearward retainers, 282*a*, 282*b*, respectively. In the embodiment depicted in FIGS. 1-4, the forward shaped insert 220*a* has a radiused surface that contacts a corresponding surface 282*a* of the forward cleat retainer 280*a*. The rearward shaped insert 220*b* has an angled surface that contacts a corresponding angled surface 282*b* of the rearward cleat retainer 280*b*.

Figure 5A:
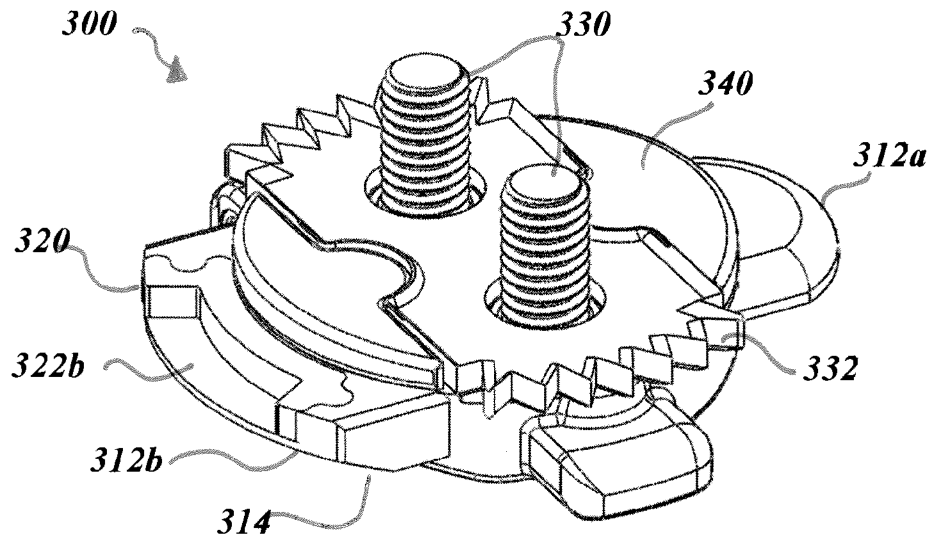
FIGS. 5A-5B are top perspective views of yet another embodiment of a cleat assembly.
Figure 5B:
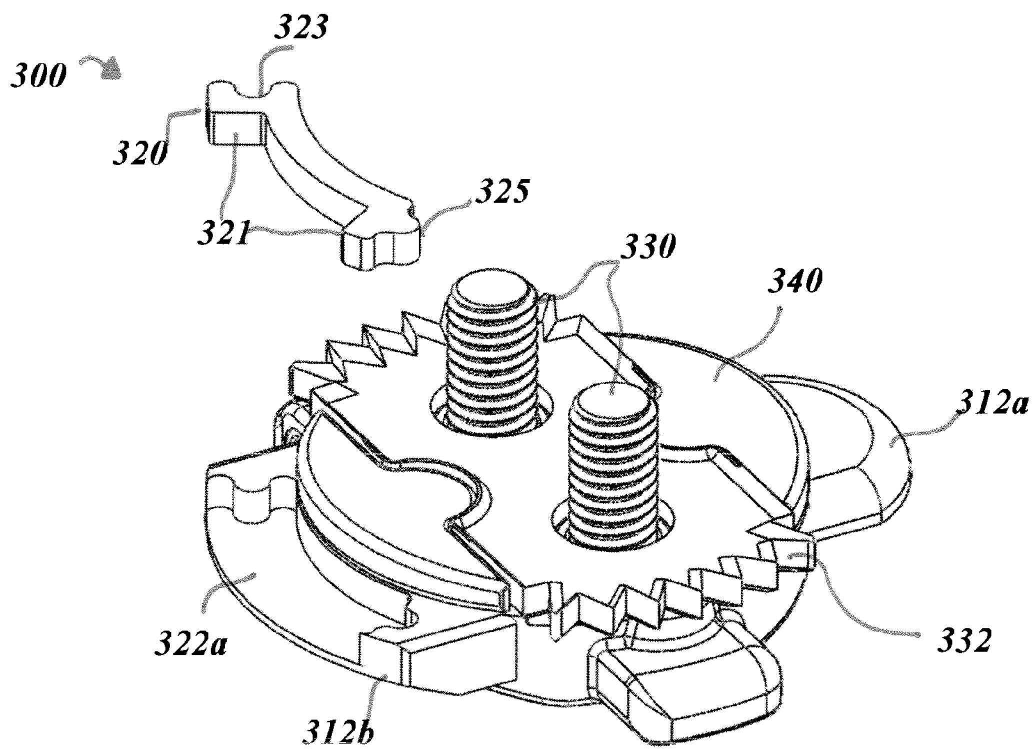
Figure 6A:
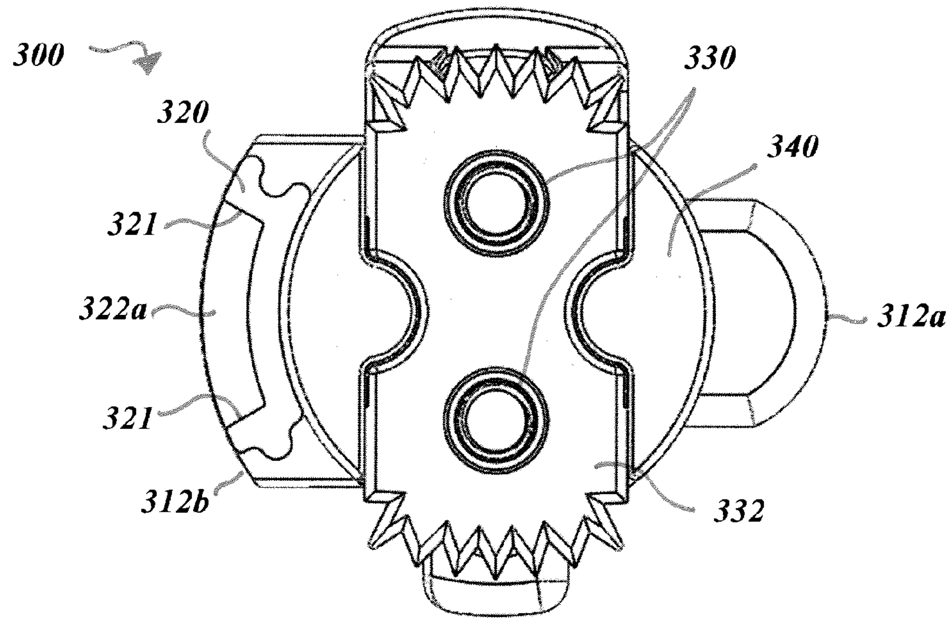
FIG. 6A is a top plan view of the cleat assembly of FIGS. 5A-B.
Figure 6B:
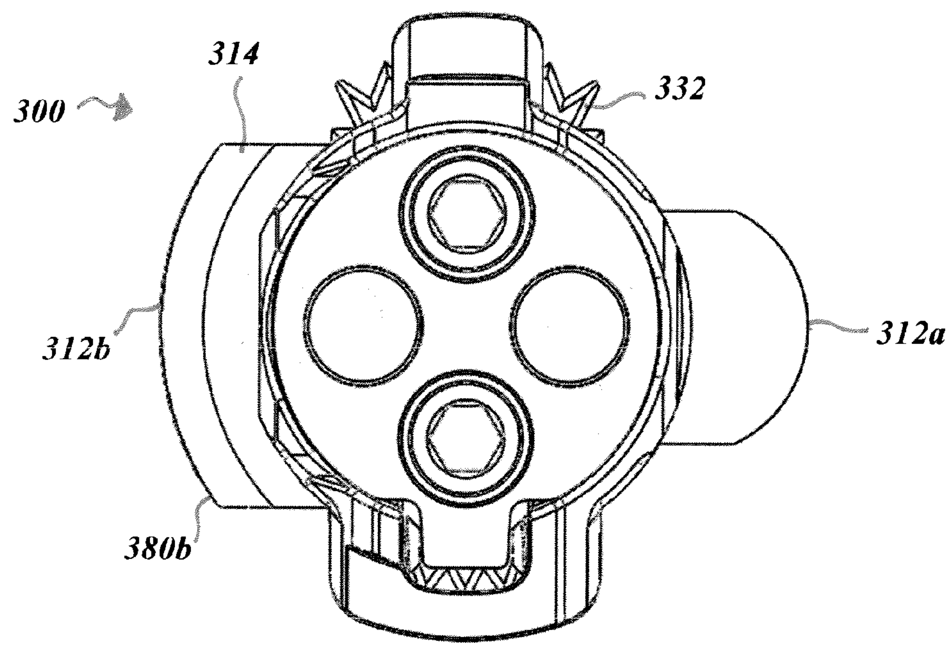
FIG. 6B is a bottom plan view of the cleat assembly of FIGS. 5A-B.
Figure 7:
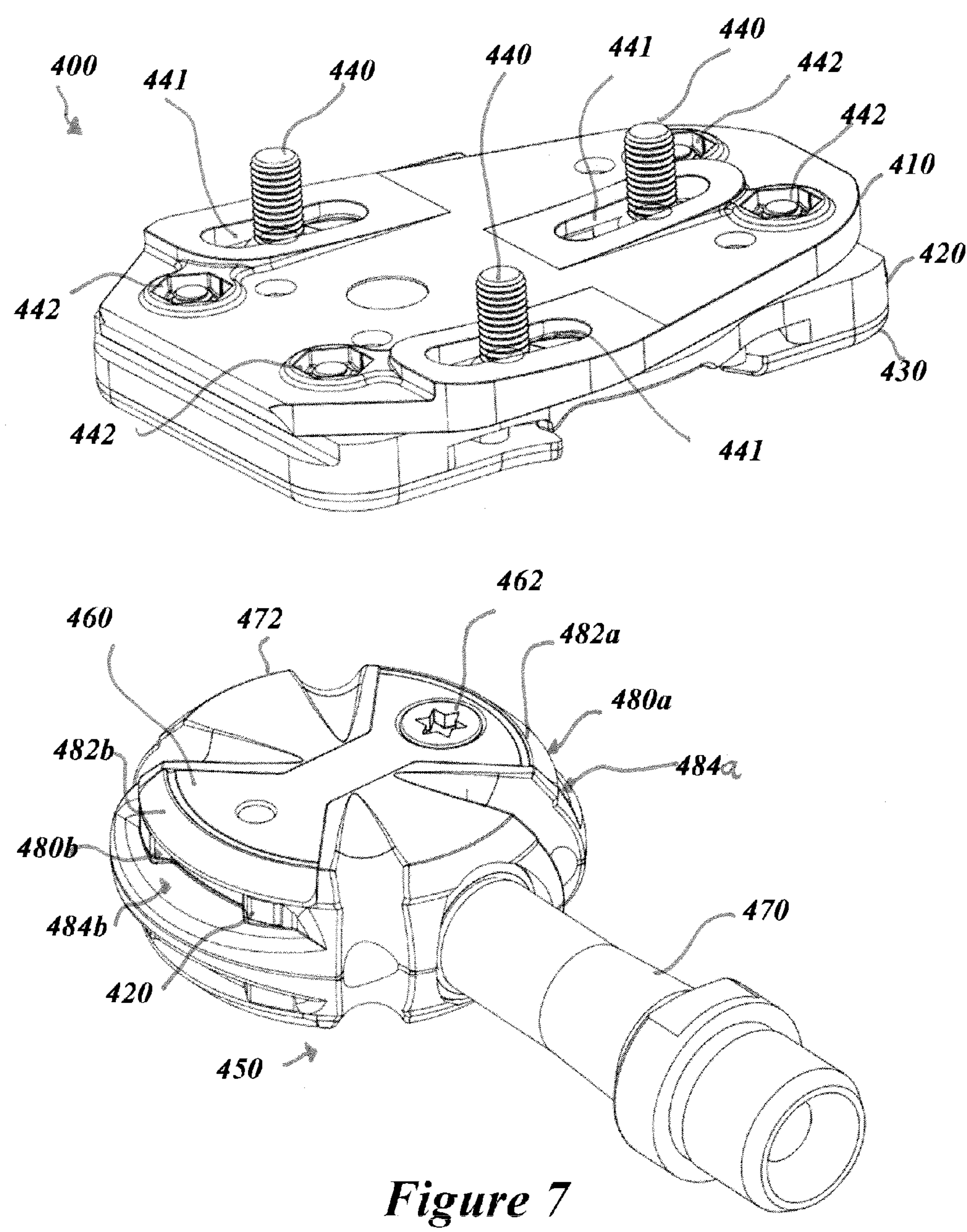
FIG. 7 is an exploded perspective view of a further embodiment of a pedal and cleat assembly.
Figure 8A:
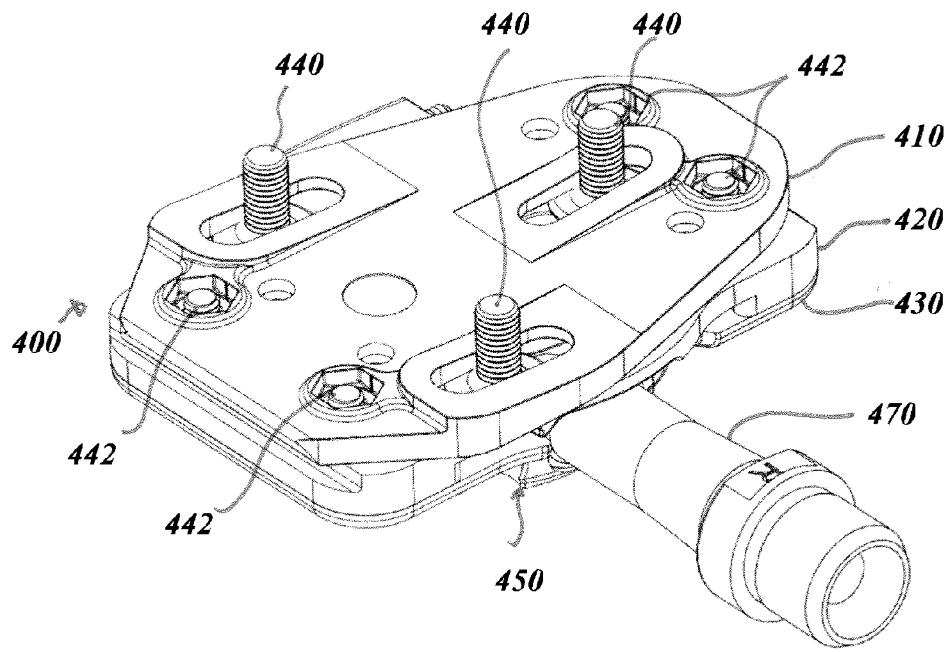
FIGS. 8A-8B are perspective views of the two sides of the assembled pedal and cleat assembly of FIG. 7.
Figure 8B:
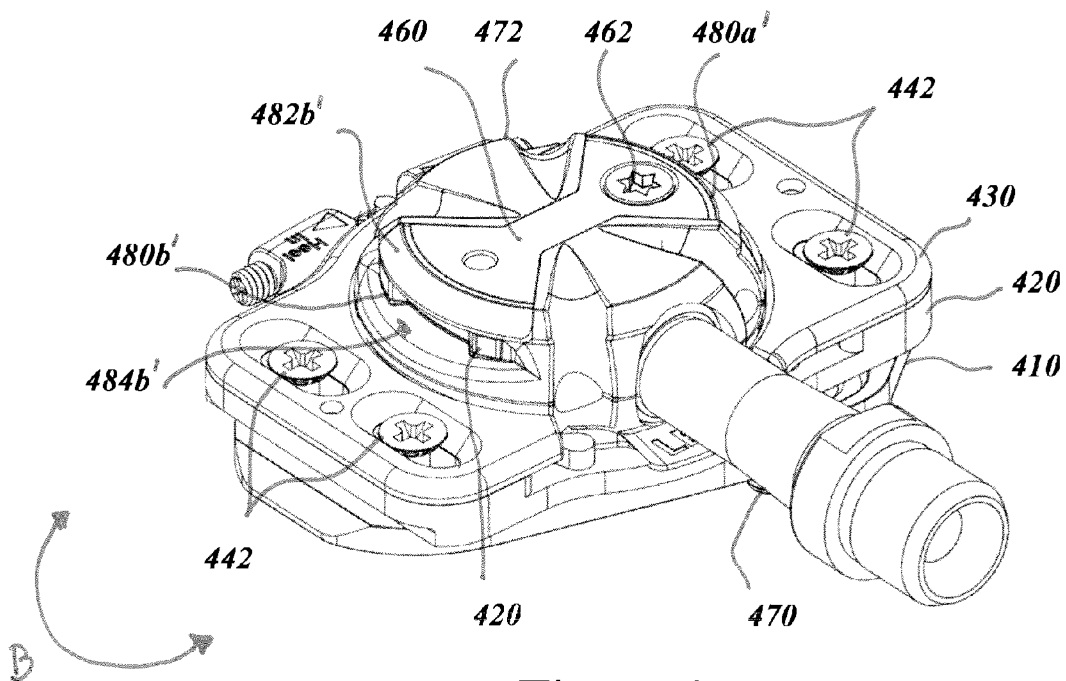
Figure 8C:
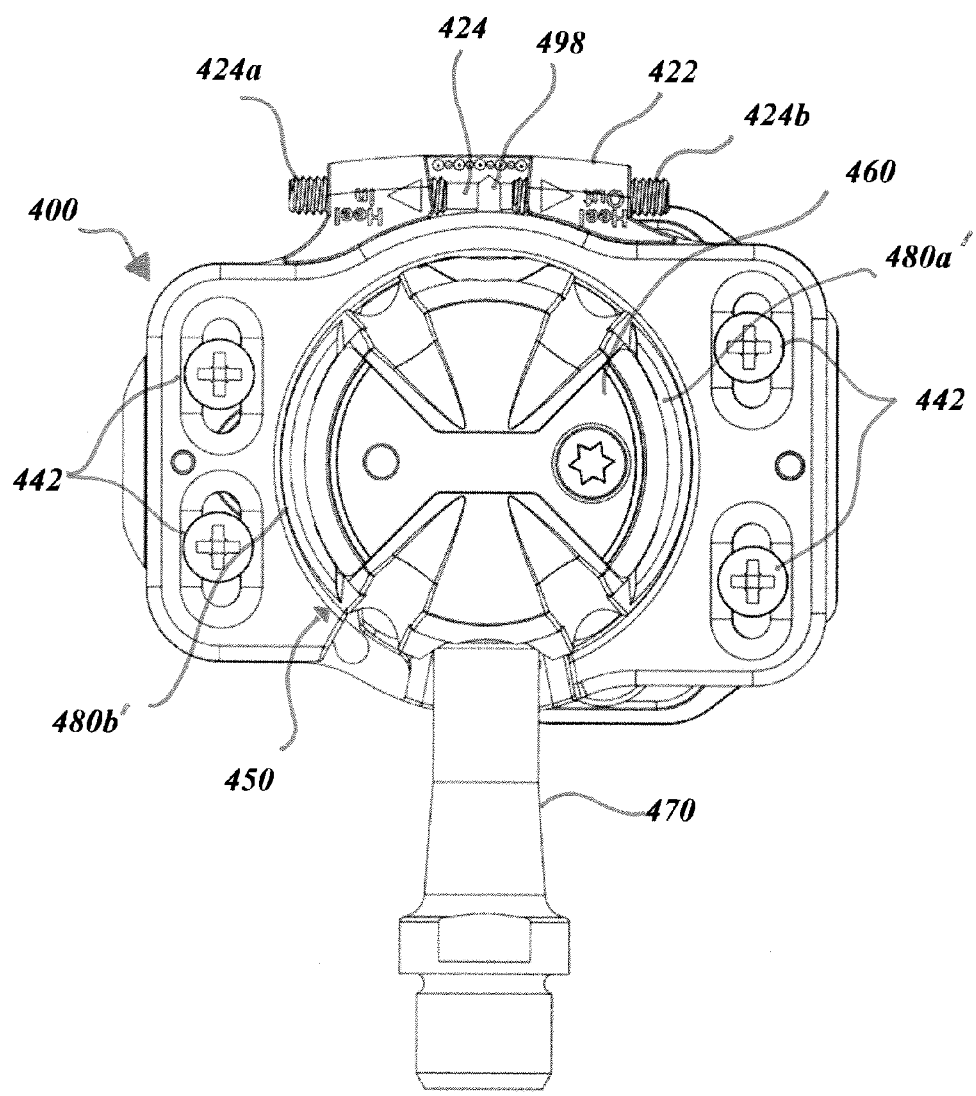
FIG. 8C is a top plan view of the assembled pedal and cleat assembly of FIG. 8B.
Figures 9A, 9B:
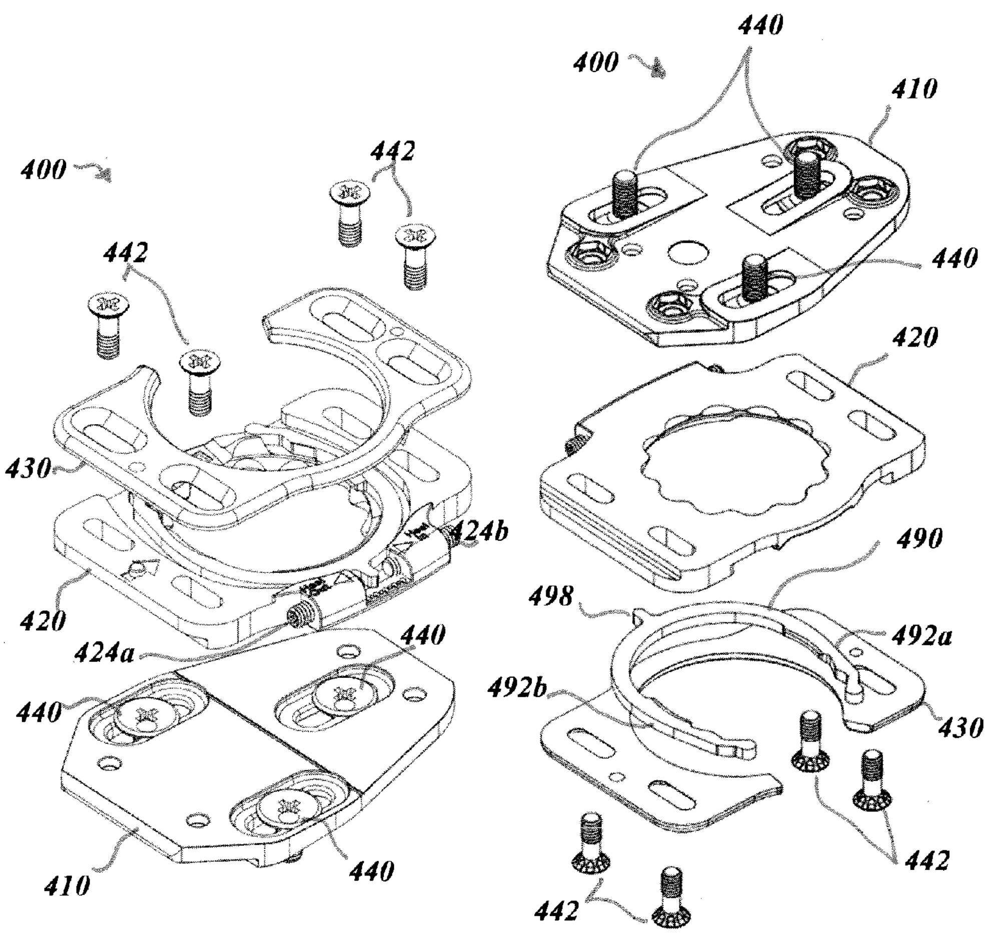
FIG. 9A-9B are exploded perspective views of the two sides of the cleat assembly of FIG. 7.
Figure 10:
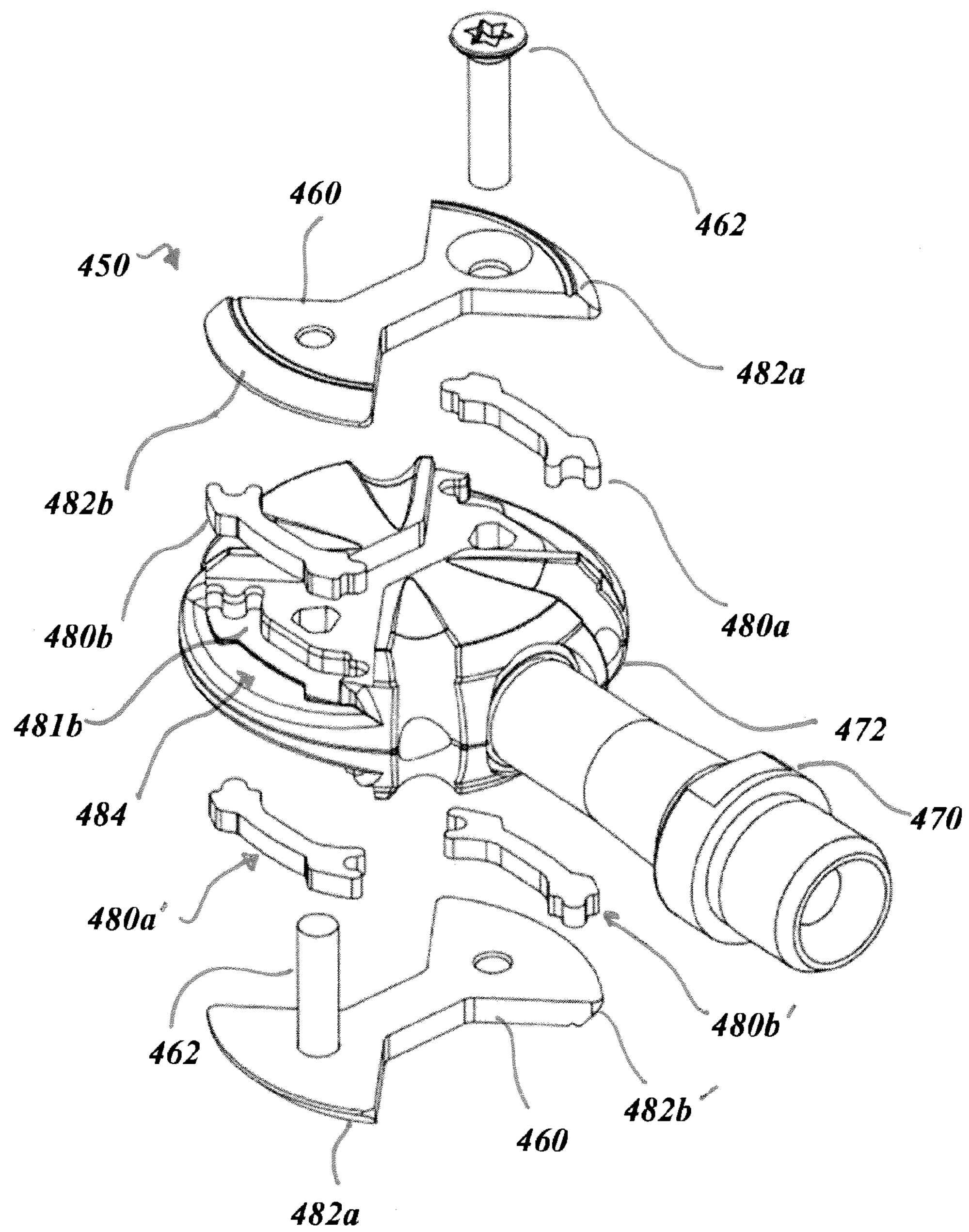
FIG. 10 is an exploded perspective view of the pedal assembly of FIG. 7.

FIGS. 5-6 depict yet another embodiment of a cleat assembly 300. As with the cleat assembly 200 depicted and described with respect to FIGS. 3-6, the cleat assembly 300 of FIGS. 5-6 comprises a cleat body 310, a spacer 340, a disc-shaped body (not shown) and a base plate 332 that is secured together and to the underside of the shoe's sole (not shown) by a pair of screws 330. The rearward projection 312*b* also comprises a beveled first urging surface 314. The cleat assembly 300 may be used in the same manner as the cleat assembly 200 in connection with the pedal assembly 250 depicted in FIGS. 1-4. Thus, the cleat assembly 300 may be interchangeable with the cleat assembly 200 with respect to the pedal assembly 250 depicted in FIGS. 1-4.

The cleat assembly 300 depicted in FIGS. 5-6, however, differs from cleat assembly 200 with respect to the configuration of the forward and rearward projections 312*a*, 312*b*. First, the forward projection 312*a* does not comprise a shaped insert and second, the rearward projection 312*b* comprises a single shaped insert 320 that covers the three lateral sides of the cavity 322*b* defined by the rearward projection 312*b*. The abutting surfaces of the shaped insert 320 and the rearward projection 312*b* are shaped (see FIG. 5B at 323, 325) so as to securely fix the shaped insert 320 within correspondingly shaped portions within the cavity 322*a*. It is understood that the rearward retainer 280 that engages and couples the cleat assembly 300 is shaped to fit in the cavity 322*b* that is defined by the shaped insert 320 that is fitted within the rearward projection 312*b*. In a preferred embodiment, the rearward retainer 280*b* is shaped to form close tolerances with the abutting surfaces 321 of the insert 320.

Thus, in the embodiment depicted in FIGS. 1-4, the pedal assembly 250 is described as comprising the forward and rearward retainers 280*a*, 280*b* and the cleat assembly 200 is described as comprising the forward and rearward projections 212*a*, 212*b*. It is understood, however, that the respective mechanisms be switched such that the pedal assembly 250 comprise the forward and rearward projections 212*a*,

212*b* and cleat assembly 200 comprise the forward and rearward retainers 280*a*, 280*b*.

In the embodiment depicted in FIGS. 5-6, the cleat assembly's first urging surface 314 and the pedal assembly's rearward cleat retainer 280*b* are forcibly contacted with one another to effectuate an engagement of the cleat and pedal assemblies. The engaged cleat assembly 200 may be released from the pedal assembly 250 by rotating the cleat assembly 200 in the direction B relative to the pedal assembly 250 such that a forcible contact is made between the lateral surface 321 of the cleat assembly's shaped insert 320 and the edge surface 282*b* of the rearward cleat retainer 280*b* upon a rotational movement along B to effectuate a release of the cleat and pedal assemblies.

In order to ensure that the mechanism of engagement and release of the cleat assembly to the pedal assembly occurs smoothly and without significant disruption, at least one of the two sets of contacting surfaces, the first of which comprise the first urging surface 314 and the outer surface 280*b*, and the second one of which comprise the cleat assembly's shaped insert 320 and the edge surface 282*b* of the rearward cleat retainer 280*b*, are preferably made of a material having sufficient strength to withstand the repeated application of force and a sufficiently low coefficient of friction to permit the smooth relative sliding of the contact surfaces. Significantly, the material must retain these properties under a variety of conditions, e.g., when it is wet or dirty.

In a preferred embodiment, either one or both of the sliding contacting surfaces is/are made of a material having a measure of hardness that is greater than hardened steel. Any one of several measures of hardness may be used to determine the relative hardness of a material vis-à-vis hardened steel, such as Mohs, Vickers, Brinell, etc. Any material characterized as having a measure of hardness that is greater than hardened steel, regardless of the method of measurement, may be a suitable material for use in either one or both of a set of contacting surfaces. For example, hardened steel is generally characterized as having a Mohs hardness of about 7.0. Thus, any material having a Mohs hardness greater than 7.0 is suitable for use in either or both of the contacting surfaces.

Non-metals, such as ceramics and, more preferably, carbides represent one class of such suitable materials. Carbides are generally characterized as having a Mohs hardness of 9 or more and include silicon carbide, boron carbide, tungsten carbide and titanium carbide. Carbides are preferable because they are characterized as being extremely hard, non-brittle, resistant to corrosion, and resistant to adhering to other surfaces in the presence of friction.

Referring now to the particular embodiment depicted in FIGS. 5-6, the shaped insert 320 is preferably made of a material having a measure of hardness that is greater than hardened steel, and preferably a carbide material, and the remainder of the rearward projection 312*b* is made of a metal, preferably hardened steel.

Generally, either one or both of the shaped insert 320 and/or the second cleat retainer 280*b* is/are made of a material that has a hardness greater than hardened steel. In embodiments where only one of the two contacting surfaces is made of carbide, it is preferably the shaped insert 320. The other one of the two contacting surfaces may be made of a suitable metal or plastic, preferably hardened steel.

FIGS. 7-11 depict a further embodiment of a cleat and pedal assembly 400, 450. The cleat assembly 400 includes a base plate 410, preferably made of a lightweight material such as plastic, configured to be secured to the shoe's sole (not shown) by screws 440 extending through three elongated openings. The cleat assembly 400 further includes a spring housing 420, preferably made of plastic, and a bottom plate 430, preferably made of a metal, such as aluminum or steel, which are secured together by four screws 422 to the base plate 410. The spring housing 420 and the bottom plate 430 together define a circular central opening (see FIGS. 9A-9B) sized and shaped to receive a portion of the pedal assembly 450. A spring or retainer portion 490 is mounted between the spring housing 420 and the bottom plate 430 for releasably engaging the pedal assembly 450 when the cleat assembly 400 is positioned over the pedal assembly 450.

The pedal assembly 450 is generally disk-shaped and symmetrical along a bisecting plane, defining an upper side (engaged to the cleat 400) and an identical lower side (not engaged to the cleat 400 and designated by '). This configuration permits the cleat to be releasably attached to either side of the pedal. The pedal 450 includes a disk-shaped pedal body 472 for attachment to a pedal crank (not shown) via a spindle 470. A planar, bow-tie shaped insert 460 is located within an identically-shaped shallow recess formed in the pedal body's outer planar surface and secured to the pedal body 472 by screws 462. The insert 460 extends diametrically across the entire outer surface and the insert's upper surface is coplanar with the pedal body's outer surface.

Engagement edges 484*a*, 484*b* in the form of recesses are defined in the pedal body 472 beneath the opposite ends 482*a*, 482*b* of the planar inserts 460. The engagement edges 484*a*, 484*b* are configured and sized to be engaged by portions of the cleat assembly 400 to releasably secure it to the pedal assembly 450. Cam inserts 480*a* and 480*b* are located beneath the respective opposite ends 482*a*, 482*b* and secured within similarly shaped recesses 481*a*, 481*b*. The cam inserts 480*a* and 480*b* are confined within these similarly shaped recesses by securement of the overlying planar inserts 460 and cooperate with the spring 490 of the cleat assembly 400 to facilitate a convenient release of the cleat assembly 400 from the pedal assembly 450.

Figure 11:
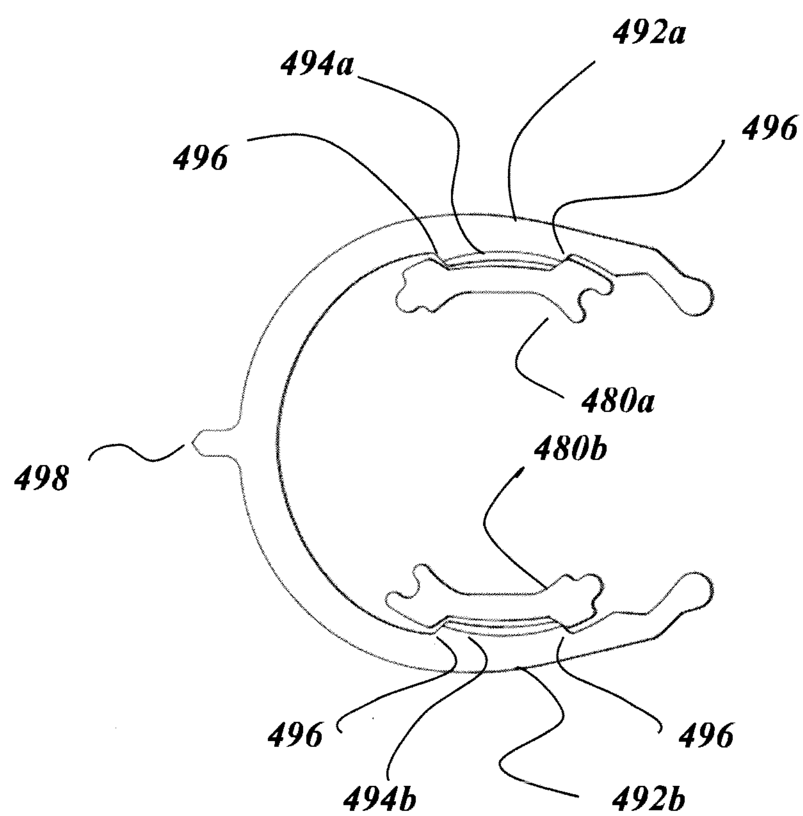
FIG. 11 is a plan view showing the engagement of the spring of the cleat assembly and the cam member disposed in the pedal assembly.

FIG. 11 illustrates the relationship between the spring 490 and the cam inserts 480*a*, 480*b* when the cleat assembly 400 is coupled to the pedal assembly 450. The horseshoe shaped spring 490 is depicted here as being in the engagement position, to which it is resiliently biased, and comprises a forward and rearward leg 492*a*, 492*b* configured to engage the pedal assembly 450 beneath the opposite ends 482*a*, 482*b*, respectively. In particular, the inward projections 494*a*, 494*b* of the forward and rearward legs 492*a*, 492*b*, respectively, are received in correspondingly shaped recesses of the cam inserts 480*a*, 480*b*. After the spring 490 is engaged with the cam inserts 480*a*, 480*b* of the pedal assembly 450, the cleat assembly 400 is free to rotate relative to the pedal to a limited extent in both the clockwise and counterclockwise directions. During this limited rotation, the spring 490 remains locked to the pedal assembly 450 and the remainder of the cleat assembly 400 rotates relative to the spring 490. The amount of rotation may be limited when a finger 498 projecting outwardly from the spring's mid-point reaches one of two adjustable screw sets 424*a*, 424*b*. The float angle is increased or decreased by adjusting the screws.

The underside of the spring's inward projections 494*a*, 494*b* defines a first spring urging surface that contacts the opposite ends 482*a*, 482*b*, respectively, of the pedal assembly 450 before the cleat assembly 400 is secured to the pedal assembly 450. In a preferred embodiment, the contacting surfaces of the first spring urging surfaces and the pedal assembly's opposite ends 482*a*, 482*b* are shaped to facilitate the sliding movement of the spring 490 across the opposite ends 482*a*, 482*b* and to urge the forward and rearward legs 492*a*, 492*b* apart to a spring yielding position. To that end, the contacting surfaces may have complementary radiused or angled beveled surfaces. Once the forward and rearward legs 492*a*, 492*b* clear the opposite ends 482*a*, 482*b*, respectively, the spring 490 snaps to an engagement position to thereby secure the cleat assembly 400 to the pedal assembly 450.

The spring's inward projections 494*a*, 494*b* further comprise second spring urging surfaces 496 defined along the lateral surface. The second spring urging surfaces 496 are configured and shaped to be received within the groove defined by the cam inserts 480*a*, 480*b* to further secure the cleat assembly 400 to the pedal assembly 450. Rotation of the cleat assembly 400 relative to the pedal assembly 450, in either direction, causes the second spring urging surfaces 496 to contact the cam inserts 480*a*, 480*b* and urge the forward and rearward legs 492*a*, 492*b* apart to a spring yielding position. To that end, the contacting surfaces of the second spring urging surfaces 496 and the cam inserts 480*a*, 480*b* may be shaped to facilitate the movement of the inward projections 494*a*, 494*b* out of the groove defined by the cam inserts 480*a*, 480*b* to urge the forward and rearward legs 492*a*, 492*b* apart to a yielding position and thereby permit release of the spring 490 and thus the cleat assembly 400 from the pedal assembly 450.

In a preferred embodiment, the spring 490 is made of a durable and resilient material. In a preferred embodiment, the spring 490 is made of hardened steel and the cam inserts 480*a*, 480*b* are made of a material that has a measure of hardness that is greater than hardened steel (e.g., a Mohs hardness of greater than 7.0), preferably a carbide material as described above.

Any one of several measures of hardness may be used to determine the relative hardness of a material vis-à-vis hardened steel, such as Mohs, Vickers, Brinell, etc. Any material characterized as having a measure of hardness that is greater than hardened steel, regardless of the method of measurement, may be a suitable material for use in either one or both of a set of contacting surfaces. For example, hardened steel is generally characterized as having a Mohs hardness of about 7.0. Thus, any material having a Mohs hardness greater than 7.0 is suitable for use in either or both of the contacting surfaces.

Non-metals, such as ceramics and, more preferably, carbides represent one class of such suitable materials. Carbides are generally characterized as having a Mohs hardness of 9 or more and include silicon carbide, boron carbide, tungsten carbide and titanium carbide. Carbides are preferable because they are characterized as being extremely hard, non-brittle, resistant to corrosion, and resistant to adhering to other surfaces in the presence of friction The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

The following patent publications are incorporated herein by reference in their entireties: U.S. Pat. No. 7,877,904, issued Feb. 1, 2011, U.S. Pat. No. 7,472,498, issued Jan. 6, 2009, U.S. Pat. No. 6,494,117, issued Dec. 17, 2002, U.S. Pub. No. 2012/0103131, published May 3, 2012.

What is claimed is:

1. A pedal and cleat assembly comprising:

a pedal assembly and a cleat assembly, one of the pedal or cleat assembly comprising first and second retainers configured to be biased to an engagement position for coupling the other one of the pedal or cleat assembly, the other one of the pedal or cleat assembly comprising first and second portions configured to be releasably secured by the first and second retainers in the engagement position, the second portion having first and second urging surfaces;

wherein either one or both of the first and second retainers are configured to be urged to a yielding position through forcible contact by one upon the other of the first urging surface and an outer surface of the second retainer, when the pedal assembly and the cleat assembly are not coupled together;

wherein either one or both of the first and second retainer are further configured to be urged to the yielding position through forcible contact by one upon the other of the second urging surface and a lateral surface of the second retainer, when the pedal assembly and the cleat assembly are coupled together;

wherein the second urging surface is made of a non-metallic material having a measure of hardness that is greater than hardened steel;

wherein a shaped recess is formed on an opposing side of the first urging surface;

wherein the second urging surface comprises a shaped insert coupled to the shaped recess; and wherein the shaped insert is formed of the non-metallic material.

2. The pedal and cleat assembly of claim 1, wherein the non-metallic material comprises carbide.

3. The pedal and cleat assembly of claim 2, wherein the carbide is selected from the group consisting of: silicon carbide, boron carbide, tungsten carbide, and titanium carbide.

4. The pedal and cleat assembly of claim 1, wherein the second urging surface is made of a non-metallic material comprising carbide and the lateral surface of the second retainer is made of a material comprising a metal.

5. The pedal and cleat assembly of claim 4, wherein the metal is hardened steel.

6. The pedal and cleat assembly of claim 1, wherein both the lateral surface of the second retainer and the second urging surface are made of a carbide.

7. The pedal and cleat assembly of claim 1, wherein the first and second retainers are provided on the pedal assembly and the first and second portions are provided on the cleat assembly.

8. The pedal and cleat assembly of claim 1, wherein the non-metallic material comprises a ceramic material.

9. The pedal and cleat assembly of claim 1, wherein the shaped insert has an angled surface configured to contact the lateral surface of the second retainer when the second portion is secured by the second retainer.

10. A pedal and cleat assembly comprising:

a pedal assembly and a cleat assembly, one of the pedal or cleat assembly comprising a retainer portion configured to be biased to an engagement position to releasably secure an engagement portion disposed on the other one of the pedal or cleat assembly, the engagement portion comprising first and second urging surfaces;

wherein the retainer portion is configured to be urged to a yielding position through forcible contact by one upon the other of the first urging surface and an outer surface of the retainer portion, when the pedal assembly and the cleat assembly are not coupled together;

wherein the retainer portion is further configured to be urged to the yielding position through forcible contact by one upon the other of the second urging surface and a lateral surface of the retainer portion, when the pedal assembly and the cleat assembly are coupled together; and wherein the second urging surface is made of a non-metallic material having a measure of hardness that is greater than hardened steel;

wherein a shaped recess is formed on an opposing side of the first urging surface;

wherein the second urging surface comprises a shaped insert coupled to the shaped recess; and wherein the shaped insert is formed of the non-metallic material.

11. The pedal and cleat assembly of claim 10, wherein the retainer portion is resiliently biased to the engagement position.

12. The pedal and cleat assembly of claim 10, wherein the non-metallic material comprises carbide.

13. The pedal and cleat assembly of claim 12, wherein the carbide is selected from the group consisting of: silicon carbide, boron carbide, tungsten carbide, and titanium carbide.

14. The pedal and cleat assembly of claim 10, wherein the second urging surface is made of a non-metallic material comprising carbide and the lateral surface of the retainer portion is made of a material comprising a metal.

15. The pedal and cleat assembly of claim 14, wherein the metal is hardened steel.

16. The pedal and cleat assembly of claim 10, wherein both the lateral surface of the retainer portion and the second urging surface are made of a carbide.

17. The pedal and cleat assembly of claim 10, wherein the non-metallic material comprises a ceramic material.

18. The pedal and cleat assembly of claim 10, wherein the shaped insert has an angled surface configured to contact the lateral surface of the retainer portion when the engagement portion is secured by the retainer portion.

19. A pedal and cleat assembly comprising:

a pedal assembly and a cleat assembly, one of the pedal or cleat assembly comprising a retainer for removably coupling the other one of the pedal or cleat assembly, the retainer comprising a first surface;

the other one of the pedal or cleat assembly comprising an engagement portion configured to be removably coupled to the retainer, the engagement portion having a second surface;

wherein the first and second surfaces are in contact with one another when the pedal and cleat assembly are coupled to one another;

wherein the second surface acts as a cam surface against the first surface upon rotation of the cleat assembly with respect to the pedal assembly when the pedal and cleat assembly are coupled to one another;

wherein the second surface is made from a non-metallic material having a measure of hardness that is greater than hardened steel;

wherein a shaped recess is formed on the engagement portion;

wherein the second surface comprises a shaped insert coupled to the shaped recess; and wherein the shaped insert is formed of the non-metallic material.

20. The pedal and cleat assembly of claim 19, wherein the non-metallic material comprises carbide.

21. The pedal and cleat assembly of claim 20, wherein the carbide is selected from the group consisting of: silicon carbide, boron carbide, tungsten carbide, and titanium carbide.

22. The pedal and cleat assembly of claim 19, wherein the second surface is made of a non-metallic material comprising carbide and the first surface is made of a material comprising a metal.

23. The pedal and cleat assembly of claim 22, wherein the metal is hardened steel.

24. The pedal and cleat assembly of claim 19, wherein both the first surface and the second surface are made of a carbide.

25. The pedal and cleat assembly of claim 19, wherein the retainer is a spring movably coupled to the cleat assembly, the spring being made of a resilient metal.

26. The pedal and cleat assembly of claim 19, wherein the non-metallic material comprises a ceramic material.

27. The pedal and cleat assembly of claim 19, wherein:

the first surface is angled; and the shaped insert has an angled surface corresponding to the angled first surface.

* * * * *